(No Model.)
J. H. CROSKEY.
WHEEL.
No. 596,261. Patented Dec. 28, 1897.
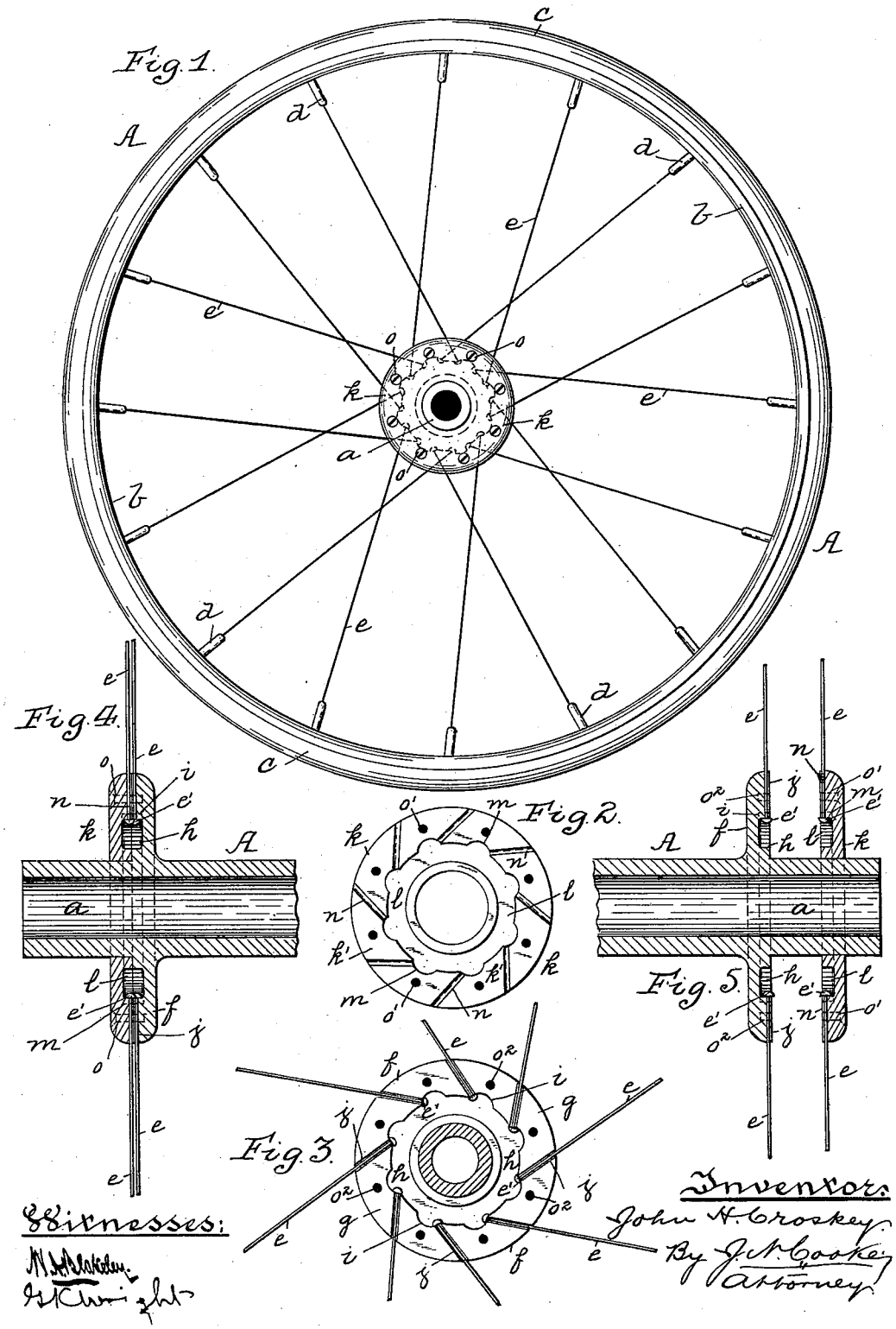
Witnesses:
Inventor:
John H. Croskey
By J. N. Cooke
Attorney

UNITED STATES PATENT OFFICE.

JOHN H. CROSKEY, OF PITTSBURG, PENNSYLVANIA, ASSIGNOR OF ONE-HALF TO GEORGE W. MORSE, OF SAME PLACE.

WHEEL.

SPECIFICATION forming part of Letters Patent No. 596,261, dated December 28, 1897.

Application filed July 30, 1897. Serial No. 646,500. (No model.)

*To all whom it may concern:*

Be it known that I, JOHN H. CROSKEY, a citizen of the United States, residing at Pittsburg, in the county of Allegheny and State of Pennsylvania, have invented a new and useful Improvement in Wheels; and I do hereby declare the following to be a full, clear, and exact description thereof.

My invention relates to wheels, and has special reference to wheels provided with metallic spokes.

The object of my invention is to provide a wheel in which the metallic spokes can be cheaply and easily secured to the hub of the wheel in such a manner as to preclude the entrance of dirt or other foreign matter into the hub.

Another object of my invention is to provide a wheel in which a hub and the flanges thereon can be easily and rapidly cleaned; and a still further object of my invention is to form a wheel in which the spokes are so arranged around the hub as to allow play for the same upon any end thrusts upon the wheel or spokes, as well as to enable the spokes to have a direct pull within the hub when necessary from any cause.

My invention consists, generally stated, in the novel construction, combination, and arrangement of parts, as hereinafter more specifically set forth and described, and particularly pointed out in the claims.

To enable others skilled in the art to which my invention appertains to construct and use such a wheel, I will describe the same more fully, referring to the accompanying drawings, in which—

Figure 1 is a side view of a wheel, showing my invention applied thereto. Fig. 2 is an enlarged inside face view of the collar which forms part of the hub. Fig. 3 is an enlarged inside face view of the flange which forms the fixed part of the hub. Fig. 4 is an enlarged sectional view of the hub, showing the spokes and their connecting parts in their normal or closed position; and Fig. 5 is a like view of the hub, showing the parts disconnected and in their open position.

Like letters herein indicate like parts in each of the figures of the drawings.

My invention is illustrated as applied to a pneumatic-tired wheel, but it is evident that the same can be used upon any form of wheels provided with metallic spokes.

The wheel A is provided with the ordinary hub $a$ and the rim or felly $b$, around the outside face $b'$ of which is secured the tire $c$, which can be formed of rubber or any particular material desired. The felly $b$ is provided on its interior face $d'$ with the ordinary threaded sleeve $d$ for holding one end of the metallic spokes $e$, which are provided with the heads $e'$ at their opposite ends and held within the hub $a$, as hereinafter described. The hub $a$ is provided with the annular fixed flange $f$ around its exterior surface, which is provided on its inside face $g$ with the annular space $h$, having connected thereto the projecting recesses $i$, which extend into the inside face $g$ and are adapted to seat the head $e'$ of the spokes $e$ therein. Connected to the seats $i$ are the spoke-seats $j$ for holding the spokes $e$, which are formed within the inside face $g$ and extend out at an angle to the outside edge of the flange $f$. Arranged to slide upon the exterior surface of the hub $a$ is the sliding or movable collar $k$, which is provided with the annular space $l$ on its inside face $k'$, opposite to the annular space $h$ in the flange $f$, and the projecting recesses $m$ on the inside face $k'$, connected to the annular space $h$ and opposite the recesses $i$ in the flange $f$. The collar $k$ is provided on its inside face $k'$ with the spoke-seats $n$, which connect with the recesses $m$ and annular space $h$ and extend out at an angle to the outside edge of the collar $k$ and are adapted to cross the spoke-seats $j'$ in the flange $f$ when the collar $k$ is in its normal position. Screw-bolts $o$ are adapted to engage with bolt-holes $o'$ in the collar $k$ and bolt-holes $o^2$ in the flange $f$ for securing the parts of the hub in place.

The manner of constructing my improved wheel is as follows: All of the spokes $e$ being in place with their outer ends within the threaded sleeves $d$ on the rim or felly $b$, the particular ones of the spokes $e$ are placed within their particular seats $j$ on the flange $f$ with their heads $e'$ resting within the recesses $i$. After this is accomplished the collar $k$ is placed upon the hub $a$ and the remaining spokes $e$ placed within their particular seats $n$ with their heads $e'$ resting within the recesses $m$. The spokes $e$ are so arranged as to cross each other within and without the flange $f$ and collar $k$. The collar $k$ can then be put in place against the flange $f$ in position, so that the bolt-holes $o'$ $o^2$ therein are opposite each other, when the screw-bolts $o$ can be placed therein and screwed to place. When the collar $k$ is in place, the seats $j$ in the flange $f$ and the seats $n$ in the collar $k$ cross each other, so crossing the spokes $e$, as shown at $e^2$ in Fig. 1. The parts can be separated by unscrewing the bolts $o$ from engagement with the flange $f$ and collar $k$, when the collar $k$ can be moved back and the spokes $e$ unseated from their seats $j$ and $n$ in the flange $f$ and collar $k$, respectively, for any purpose desired.

It will thus be seen that in my improved wheel the parts can be easily and rapidly put together and taken apart and when in position present a plain and unbroken surface on the hub and form a tight joint, so as to prevent the entrance of dust, dirt, or any foreign matter into the hub. The device is cheap, durable, and simple in its construction, and the parts are less liable to break than when exposed, as in the ordinary devices. By its use all end thrusts on the spokes will be taken up and the spokes permitted to move within their seats, thereby overcoming the bending or breaking of the spokes, and direct pulls on the heads of the spokes are allowed without any possible injury to the parts in any manner.

Various modifications in the construction and design of the various parts of the wheel may be resorted to without departing from the spirit of the invention or sacrificing any of its advantages.

What I claim as my invention, and desire to secure by Letters Patent, is—

1. In wheels, the combination of a rim or felly having spokes connected thereto, a hub having a flange thereon, a collar on said hub adapted to be secured to said flange, seats within said flange and collar crossing each other for holding the spokes within the hub, and a space within said flange and collar to permit the movement of the spokes therein, substantially as and for the purposes set forth.

2. In wheels, the combination of a rim or felly having spokes connected thereto and provided with heads at their opposite ends, a hub having a flange thereon, a collar on said hub adapted to be secured to said flange, seats within said flange and collar crossing each other for holding the spokes within the hub, an annular space on the inside faces of the flange and collar to permit the movement of the spokes therein, and recesses on the inside faces of the flange and collar for engaging with the heads on the spokes, substantially as and for the purposes set forth.

In testimony whereof I, the said JOHN H. CROSKEY, have hereunto set my hand.

JOHN H. CROSKEY.

Witnesses:
GEORGE W. MORSE,
J. N. COOKE.